US012179511B2

(12) United States Patent
Kelsey

(10) Patent No.: US 12,179,511 B2
(45) Date of Patent: Dec. 31, 2024

(54) DISPLAY UNIT FOR LITHOPHANES

(71) Applicant: Jacob A. Kelsey, Longmont, CO (US)

(72) Inventor: Jacob A. Kelsey, Longmont, CO (US)

( * ) Notice: Subject to any disclaimer, the term of this patent is extended or adjusted under 35 U.S.C. 154(b) by 0 days.

(21) Appl. No.: 18/662,763

(22) Filed: May 13, 2024

(65) Prior Publication Data

US 2024/0383274 A1 Nov. 21, 2024

Related U.S. Application Data

(60) Provisional application No. 63/559,064, filed on Feb. 28, 2024, provisional application No. 63/467,997, filed on May 21, 2023.

(51) Int. Cl.

| | |
|---|---|
| ***G09F 13/04*** | (2006.01) |
| ***B44C 5/00*** | (2006.01) |
| ***B44C 5/08*** | (2006.01) |
| ***B44F 1/06*** | (2006.01) |
| *G09F 19/12* | (2006.01) |

(52) U.S. Cl.

CPC ................ *B44F 1/06* (2013.01); *B44C 5/005* (2013.01); *B44C 5/08* (2013.01); *G09F 19/125* (2021.05)

(58) Field of Classification Search

CPC ...... G09F 13/049; G09F 13/18; G09F 19/125; F16M 11/02; F16M 11/20; F16M 13/00; F16M 2200/024; F21V 7/05; F21V 7/22; B44F 1/06; B44C 5/005; B44C 5/08

USPC ............................................................ 40/546

See application file for complete search history.

(56) References Cited

U.S. PATENT DOCUMENTS

| | | | | | |
|---|---|---|---|---|---|
| 1,146,361 | A * | 7/1915 | Spencer et al. | G02B 6/0091 | 40/546 |
| 2,548,126 | A * | 4/1951 | Sholkin | G02B 6/0091 | 362/23.15 |
| 2,634,530 | A * | 4/1953 | Gates, Jr. | G02B 6/0081 | 40/764 |
| 3,197,902 | A * | 8/1965 | Buzan | G02B 6/0076 | 250/458.1 |
| 4,697,365 | A * | 10/1987 | Moosbrugger | G02B 6/0091 | 40/546 |
| 8,038,309 | B2 * | 10/2011 | Yang | A47G 1/0622 | 362/604 |
| 2001/0034960 | A1 | 11/2001 | O'Hanlon | | |

(Continued)

OTHER PUBLICATIONS

International Search Report and Written Opinion, International Patent Application No. PCT/US2024/029316, Sep. 9, 2024, 9 pages.

*Primary Examiner* — Cassandra Davis
(74) *Attorney, Agent, or Firm* — William M. Fischer

(57) ABSTRACT

A lithophane display unit includes a base having an opening formed in a base top surface. A receptacle extends downward from the opening into a portion of base. Display unit includes a light source positioned at or proximal to a bottom of receptacle. Display unit includes a stand piece having a top and a bottom. The bottom of stand piece is insertable into receptacle with the bottom of stand piece in proximity to light source. Stand piece includes a roughened surface formed on at least a portion of a front side of stand piece. Stand piece includes a pair of structures disposed on opposing sides of stand piece and extending from a top of stand piece to or proximate to the bottom of stand piece. The pair of structures includes a pair of slots extending from tops of the structures to bottoms of the structures. Slots may receive a lithophane.

20 Claims, 14 Drawing Sheets

(56) References Cited

U.S. PATENT DOCUMENTS

| | | | | |
|---|---|---|---|---|
| 2005/0144821 | A1* | 7/2005 | Griesemer | B41M 3/06 40/546 |
| 2009/0199444 | A1* | 8/2009 | Robinson | G09F 1/14 40/546 |
| 2010/0199533 | A1* | 8/2010 | Tsai | G09F 15/0087 40/546 |
| 2011/0002128 | A1 | 1/2011 | Cohen | |
| 2015/0016092 | A1 | 1/2015 | Mullin | |
| 2016/0187574 | A1* | 6/2016 | Tseng | A43B 1/0072 362/606 |

* cited by examiner

20

DISPLAY UNIT FOR LITHOPHANES

CROSS-REFERENCE TO RELATED APPLICATIONS

This application claims the benefit of and priority to U.S. Provisional Patent Application 63/559,064, filed Feb. 28, 2024 and U.S. Provisional Patent Application No. 63/467,997, filed May 21, 2023; the entire contents of each of which is incorporated by reference herein.

BACKGROUND

Lithophanes may be created using three-dimensional (3D) printing techniques by converting a two-dimensional (2D) image to a 3D height map. In this known technique, darker pixels in the image may be translated to thicker material in the 3D part. Conversely, lighter pixels are converted to thinner material. In a known process for visualizing an image so translated and/or converted, when the resulting 3D printed lithophane is back lit by natural daylight or by an artificial light source, the original image translated onto the lithophane may be visible in gray tone. FIG. 1 shows a 3D printed lithophane being backlit by sunlight through a window according to the known visualization process.

In the known technique for visualizing images of a 3D printed lithophane, the backlighting required is natural daylight or some artificial light source light like an electric light, or even a candle, placed behind the lithophane. Such artificial light sources are required at night or in a darkened interior room. It may be inconvenient for people to position such light sources, or the 3D printed lithophanes themselves, in this manner. Furthermore, when there is no daylight available, such an artificial light source may be required to see the image of the 3D printed lithophane. A person may need to hold the 3D printed lithophane up to the light, which may also be inconvenient and cumbersome. As such, use of the known techniques for visualizing images of a 3D printed lithophane may limit the potential usability and enjoyment of users. These or similar drawbacks may exist for users of lithophanes other than those that are 3D printed.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

A first aspect of the disclosure provides a display unit for lithophanes. The display unit may include a base including an opening formed in a portion of a top surface of the base. The display unit may include a receptacle extending downward from the opening and into a portion of the base. The display unit may include a light source positioned at or proximal to a bottom of the receptacle. The display unit may include a stand piece having a top and a bottom. The bottom of the stand piece may be configured to be inserted into the receptacle to bring the bottom of the stand piece in contact with or in proximity to the light source. The stand piece may includes a roughened surface formed on at least a portion of a front side of the stand piece. The stand piece may include a pair of structures disposed on opposing sides of the stand piece and extending from a top of the stand piece to or proximate to the bottom of the stand piece. The pair of structures may include a pair of slots extending from tops of the structures to bottoms of the structures. The slots may be configured for, or otherwise capable of, receiving opposing sides of a lithophane.

In some embodiments, the display unit according to the first aspect of the disclosure may include a power supply operably coupled to the light source. In some embodiments, the base of the display unit may include an interior cavity, and the power supply may be disposed at least in part inside the interior cavity. In some embodiments, the display unit may include at least one button (or switch, or similar device) positioned in or on the base so as to be accessible to a user during use of the display unit. In an example, the at least one button may be operably coupled to the power supply and/or to the light source to enable the user to alternately turn the light source on and turn the light source off.

The display unit may include at least one button or other means (e.g., knob or slider) for adjusting brightness of the light source. The at least one button or other means may be positioned in or on the base and accessible to a user during use of the display unit. The at least one button may be operably coupled to the power supply and/or to the light source to enable the user to alternately increase and decrease the brightness of the light source. In some embodiments, the light source of the display unit according to the first aspect of the disclosure may include a strip of a plurality of LED lamps or lights. The at least one button may also allow changing the color of the plurality of LED lights, as well as toggling through various multi-color effects, such as color wipes and fades, candle flicker and fireworks simulation, etc.

In some embodiments, at least a portion of a front side of the stand piece on which the roughened surface may be formed is clear or translucent. In an example, an entirety of the stand piece may be formed or otherwise made of a clear or translucent material of construction. In some embodiments, a material of construction of at least a portion of the base is an opaque material. In an example, a bottom of the base may be flat. In some embodiments, the receptacle of the display unit according to the first aspect may include interior walls.

A second aspect of the disclosure provides a method for manufacturing a display unit for lithophanes. The method may include the step of forming a receptacle in a portion of a base of the display unit. The step of forming the receptacle may include: forming an opening in a portion of a top surface of the base; and extending the receptacle downward from the opening into a portion of the base. The method may include the step of positioning a light source at or proximal to a bottom of the receptacle. The method may include the step of forming a stand piece having a top and a bottom, and with the bottom of the stand piece being configured to be inserted into the receptacle. The step of forming the stand piece may include: forming a roughened surface on at least a portion of a front side of the stand piece; and forming a pair of structures disposed on opposing sides of the stand piece and extending from a top of the stand piece to or proximate to the bottom of the stand piece. The step of forming the pair of structures may include the step of creating a pair of slots extending from tops of the structures to bottoms of the structures. The slots may be configured for, or otherwise capable of, receiving opposing sides of a lithophane. The method may include the step of forming the portion of the stand piece front surface which is roughened at a slight (e.g., 1-2 degrees) backward angle. The aforementioned backward angle may be greater than 0 degrees and less than or equal to 5 degrees.

In some embodiments, the method according to the second aspect of the disclosure may include the step of inserting the bottom of the stand piece into the receptacle to bring the bottom of the stand piece in contact with or in proximity to the light source. In some embodiments, the method may include the step of operably coupling the light source to a power supply. In an example, the base may include an interior cavity, and the method may include the step of positioning the power supply at least in part inside the interior cavity. In some embodiments, the method may also include the steps of: positioning at least one button or switch in or on the base to be accessible to a user during use of the display unit; and operably coupling the at least one button or switch to the power supply and/or to the light source to enable the user to alternately turn the light source on and turn the light source off.

In some embodiments, the method step of positioning the light source may include positioning a strip of a plurality of LED lamps or lights at or proximal to a bottom of the receptacle. In some embodiments, the method may include the steps of: positioning at least one button or other means for adjusting a brightness of the light source in or on the base to be accessible to a user during use of the display unit; and operably coupling the at least one button or other means for adjusting a brightness of the light source to enable the user to alternately increase and decrease the brightness of the light source. In some embodiments, the method may include the step(s) of positioning additional button(s) or other means for toggling through different colors and operating modes and dynamic color effects.

In some embodiments, the method step of forming the roughened surface may include forming the roughened surface on the at least a portion of a front side of the stand piece that is clear or translucent. In some embodiments, the portion of the roughened surface may be sloped backward at a slight (e.g., 1-2 degrees) angle. The method step of forming the stand piece may include forming the portion of the stand piece having the roughened surface at the aforementioned sloped backward angle of greater than 0 degrees and less than or equal to 5 degrees. In some embodiments, the method step of forming the stand piece may include forming the stand piece of a clear or translucent material of construction.

In some embodiments, the method may include the step of forming the base. In an example, the step of forming the base may include forming the base having a flat bottom. In another example, the step of forming the base may include forming at least a portion of the base of an opaque material of construction. In some embodiments of the method according to the second aspect of the disclosure, the method step of forming the receptacle may include forming the receptacle having interior walls.

BRIEF DESCRIPTION OF THE DRAWINGS

One or more embodiments of the present invention are illustrated by way of example and not limitation in the figures of the accompanying drawings, in which like references indicate similar elements. The depictions of embodiments in the appended drawings are not necessarily drawn to scale.

DETAILED DESCRIPTION

Figure 1:
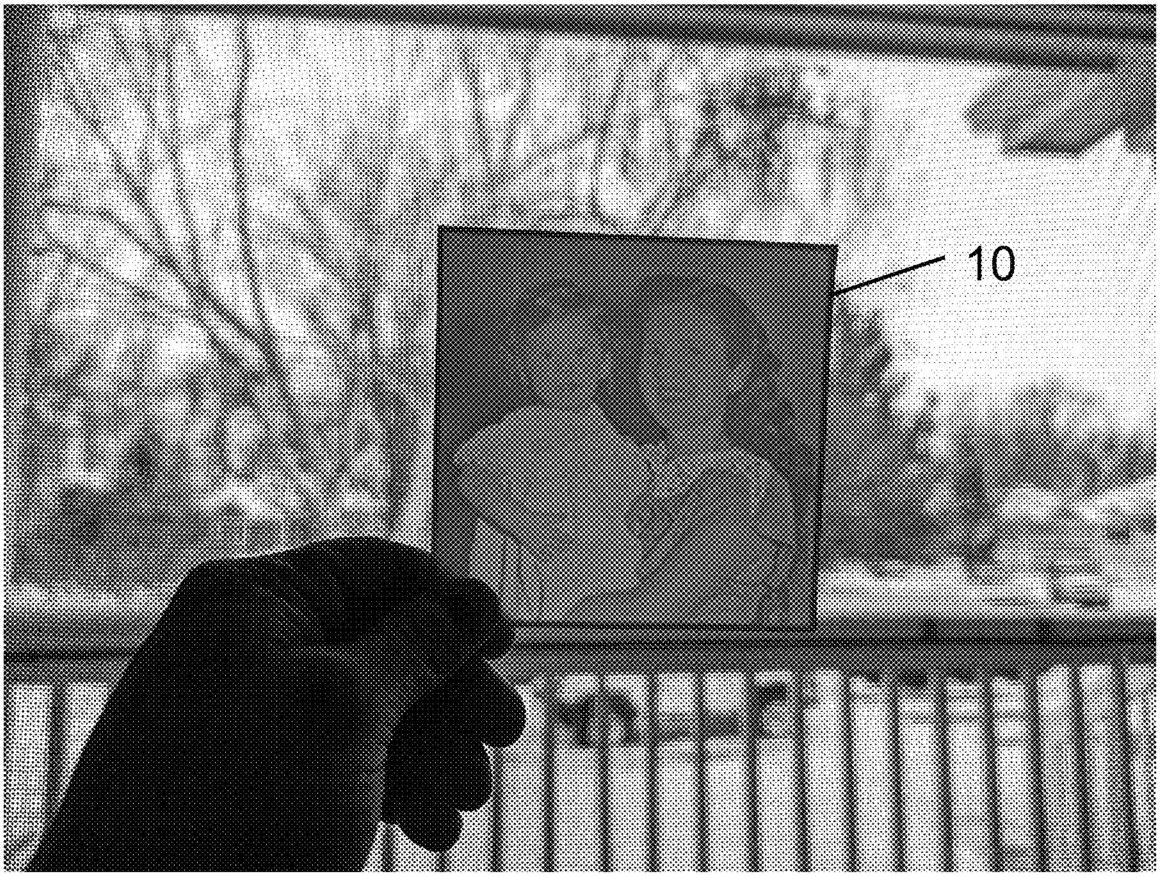
FIG. 1 (PRIOR ART)
FIG. 1 depicts a 3D printed lithophane being backlit by natural daylight through a window according to a known visualization process.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure provide devices and techniques for visualizing 3D printed lithophanes. The disclosed display unit enables an image present in a lithophane to be viewed by both natural daylight during the day and by an artificial light source in the dark or at night. As can be appreciated persons having ordinary skill in the art, the embodiments described herein according to the present technology may be advantageously practiced for lithophanes of various types other than 3D printed lithophanes without undue experimentation.

Figure 2:
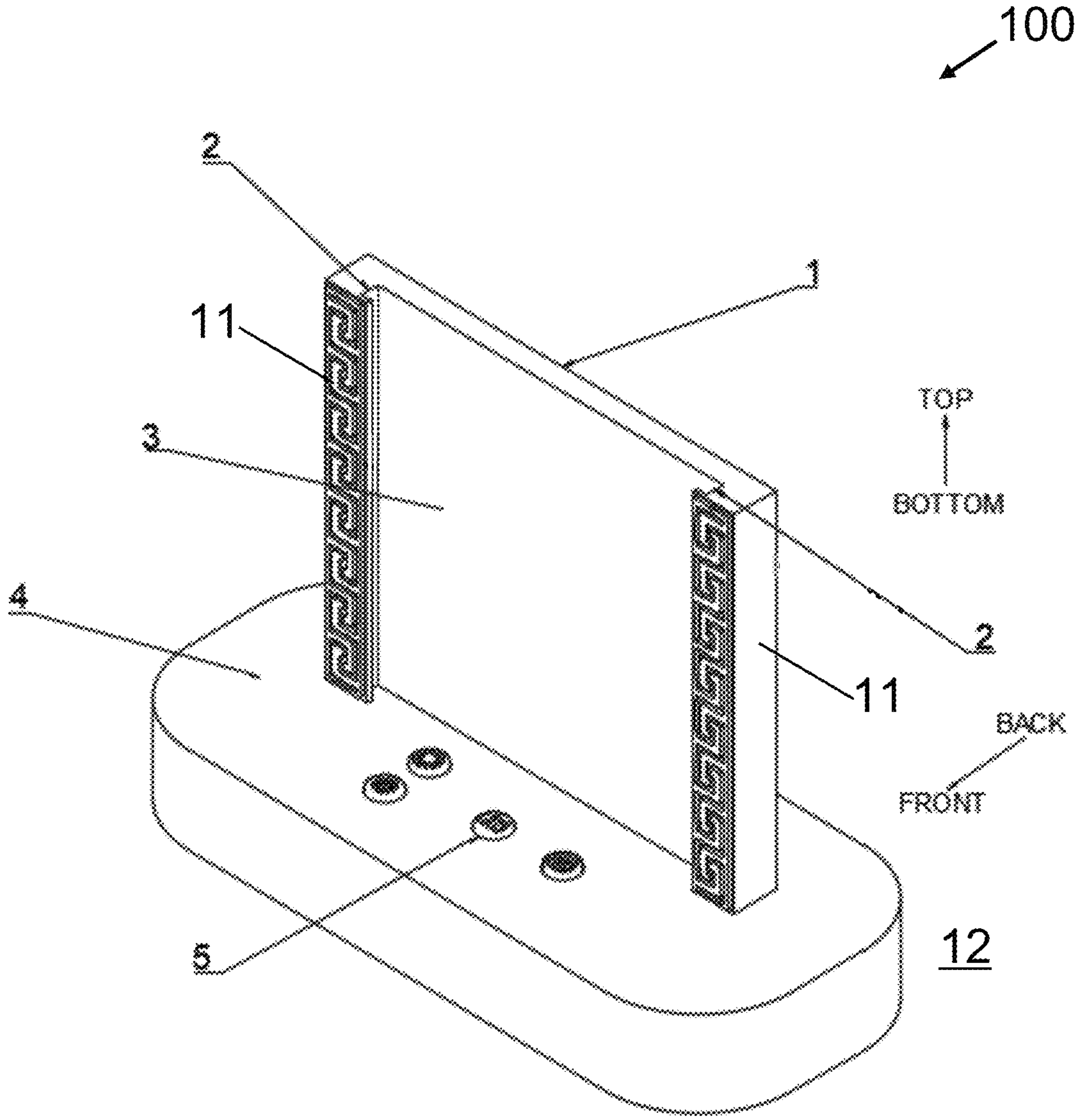
FIG. 2 is a perspective view of a display unit for lithophanes according to some embodiments of the present technology.
Figure 3:
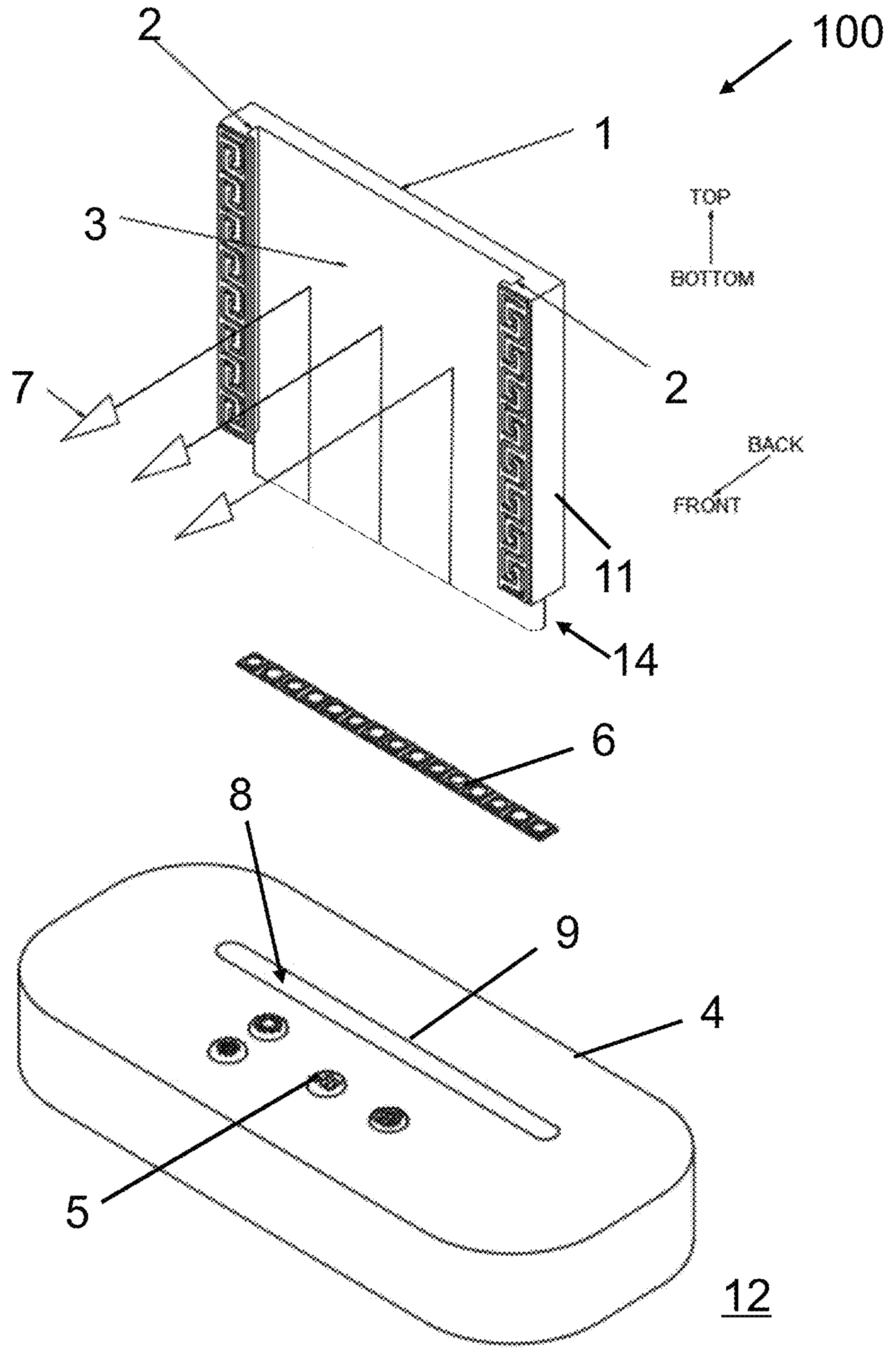
FIG. 3 is an exploded view in perspective of the display unit shown in FIG. 2.

FIG. 2 is a perspective view of a display unit 100 for lithophanes 10 according to some embodiments of the present technology. FIG. 3 is an exploded view in perspective of the display unit 100 shown in FIG. 2. Display unit 100 may include a multi-functional stand piece 1 and a base 4. Stand piece 1 may include a front side and a back side, as denoted in FIGS. 1 and 2. Stand piece 1 may be at least partially clear or translucent. A front side of stand piece 1 may have a roughened surface 3. The roughened surface 3 may extend from a top to a bottom of stand piece 1. The front surface of the stand piece 1, including the roughened surface 3 may be fabricated or otherwise formed to have a slight backward angle (e.g., 1-2 degrees). Such examples may have the aforementioned backward angle formed at a range of from greater than 0 degrees to less than or equal to 5 degrees, as described below with reference to FIG. 14. Opposing sides of stand piece 1 may include structures 11 attached to or formed on stand piece 1 that are sufficient to create slots 2 that face each other, as shown in FIGS. 2 and 3. At least a portion of front, back and/or side-facing surfaces of the aforementioned structures 11 may be well suited for inclusion of aesthetic design elements, such as are shown in FIGS. 2 and 3. In an example, stand piece 1 may be made as a one-piece 3D printed part. In other examples, stand piece 1 may be injection (or other type of) molding, casting or extrusion. In yet other examples, stand piece 1 may be made of a solid piece of plexiglass or glass, and the roughened surface 3 may be engraved onto the front side of stand piece 1 using a laser or diamond bit. In any event, a material of construction of at least the portion of stand piece 1 having the roughened surface 3 on its front side, and likewise that portion extending therefrom to the back side, is formed of a clear, or at least translucent, material of construction (e.g., plastic or glass, for example).

Display unit 100 may include a base 4 having at least partially hollow interior cavity inside of which may be various electrical and/or electronic components, at least one of which may be operably coupled to one or more buttons 5, as will be described in greater detail below. As will be appreciated by persons having ordinary skill in the art, a shape of the base 4 need not be of the shape depicted in the example embodiment shown in FIGS. 2 and 3, but rather may be any suitable shape that may enable the base 4 to stably support a weight of the multi-functional stand piece 1. As but one example, a bottom of the base 4 may be flat so as to remain stable when it is placed on a flat surface 12. In another example, several pads may be placed on the bottom side of the base 4 to enable it to remain stable when placed on a substantially flat surface.

Figure 5:
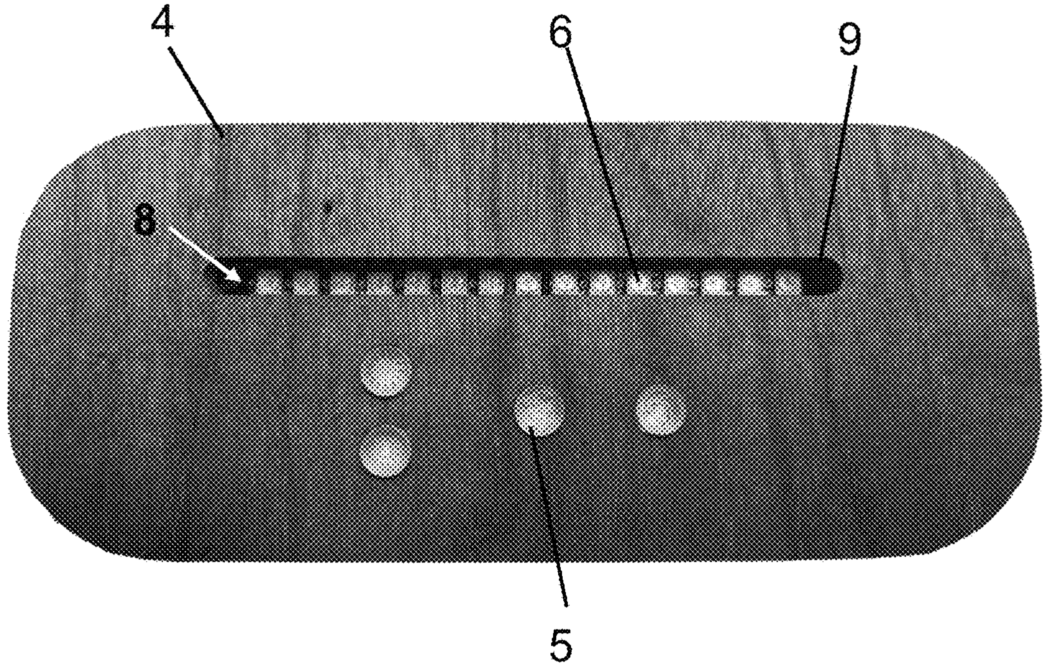
FIG. 5 is a top view of a base of a display unit for lithophanes according to some embodiments of the present technology.
Figure 6:
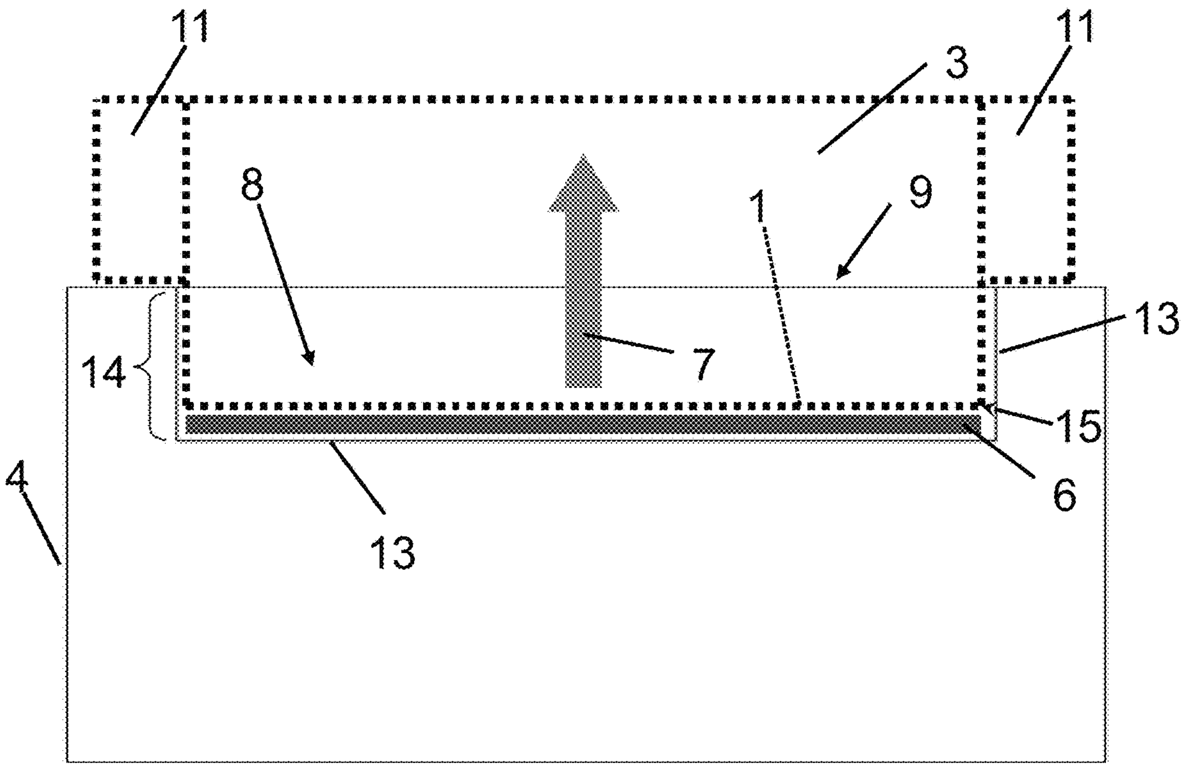
FIG. 6 is a side view of a portion of a receptacle of a base of a display unit according to some embodiments of the present technology.

A top of base 4 may include an opening 9 that provides access to at least a portion of the aforementioned interior cavity. In an example, the opening 9 forms a receptacle 8 of the base 4 that extends from a top surface of the base 4 downward into a portion of base 4. FIG. 5 is a top view of a base of a display unit 100 for lithophanes 10 according to some embodiments of the present technology. FIG. 6 is a side view of a portion of a receptacle 8 of a base 4 of a display unit 100 according to some embodiments of the present technology. With additional reference being made to FIGS. 2 and 3, display unit 100 may include an electric light source 6 operably coupled to means for providing an electric current to light source 6. Such means may include a power supply along with wiring and possible other circuitry electrically coupled to light source 6. In an example, the power supply includes one or more batteries. They may be rechargeable batteries and in some embodiments, recharging components may be disposed inside of the base 4 and electrically coupled to the rechargeable battery cell(s). In another example, the power supply may include electric circuitry components sufficient to enable a wired connection to a utility mains outlet of a house, for example, to be transformed into a direct current voltage sufficient to energize the light source 6 during operation of the display unit 100. Other examples may include a photovoltaic panel disposed on top and/or side surfaces of base 4 to provide charging current to the aforementioned rechargeable battery cell(s).

In some embodiments, a photoresistor or like light sensitive and/or light activated switching device may be included in the aforementioned circuitry to enable automatic turning on and off of the light source 6 in response to a level of ambient light existing proximate to the display unit 100. For instance, when a level of natural daylight impinging on a back facing surface of stand piece 1 drops below an appropriate threshold level, the light sensitive switching device may be activated to thereby turn on light source 6 such that a lithophane 10 may continue to be viewable to a user display unit 100.

In some embodiments, as shown, for example and without limitation, in FIGS. 5 and 6, light source 6 is embodied in a strip of a plurality of LED lamps having a side-to-side length and a front-to-back width are at least roughly equal to (or just somewhat less than) the corresponding 2D dimensions of the opening 9, as shown in FIG. 5. Also, as shown in FIGS. 5 and 6, the light source 6 embodied in an LED strip may be positioned in base 4 so as to rest at a bottom of receptacle 8. In some embodiments, at least a portion of the base 4 is formed of an opaque material of construction. In an example, walls 13 and/or a bottom of receptacle are opaque so as to prevent a significant (e.g., at most only a nominal amount) of light from being directed in unwanted or not useful directions other than in a generally top-ward direction through the opening 9. The opening 9 may be formed so as to provide a tight fit with the inserted bottom of the multi-functional stand piece 1. The aforementioned tight fit may function to prevent, or at least mitigate, any light from light source 6 from leaking through the base 4 and undesirably shining onto a face of lithophane 10 during operation of the display unit 100 according to the present technology. Gluing the bottom of stand piece 1 to the base 4 may accomplish similar ends.

Referring again to FIGS. 2, 3 and 5, in some embodiments, the receptacle 8 and opening 9 may be shaped and dimensioned to securely, yet removably, receive the stand piece 1 and enable it to be free standing upright as so positioned. In other embodiments, the stand piece 1 may instead be securely coupled to the base 4. As shown in FIG. 6, when inserted into and received by receptacle 8 through the opening 9, a bottom of the stand piece 1 may be situated upon, or proximate to, a top-ward facing portion the light source 6. In an example, dimensions of an offset or space 14 (as shown in FIGS. 2, 3 and 6) between structures 11 and the bottom of the portion of stand piece 1 having roughened surface 3 may enable the bottom of structures 11 to rest on the top surface of base 4 to thereby determine the spacing 15 between the bottom of stand piece 1 and the light source 6 (e.g., LED strip).

Figure 4:
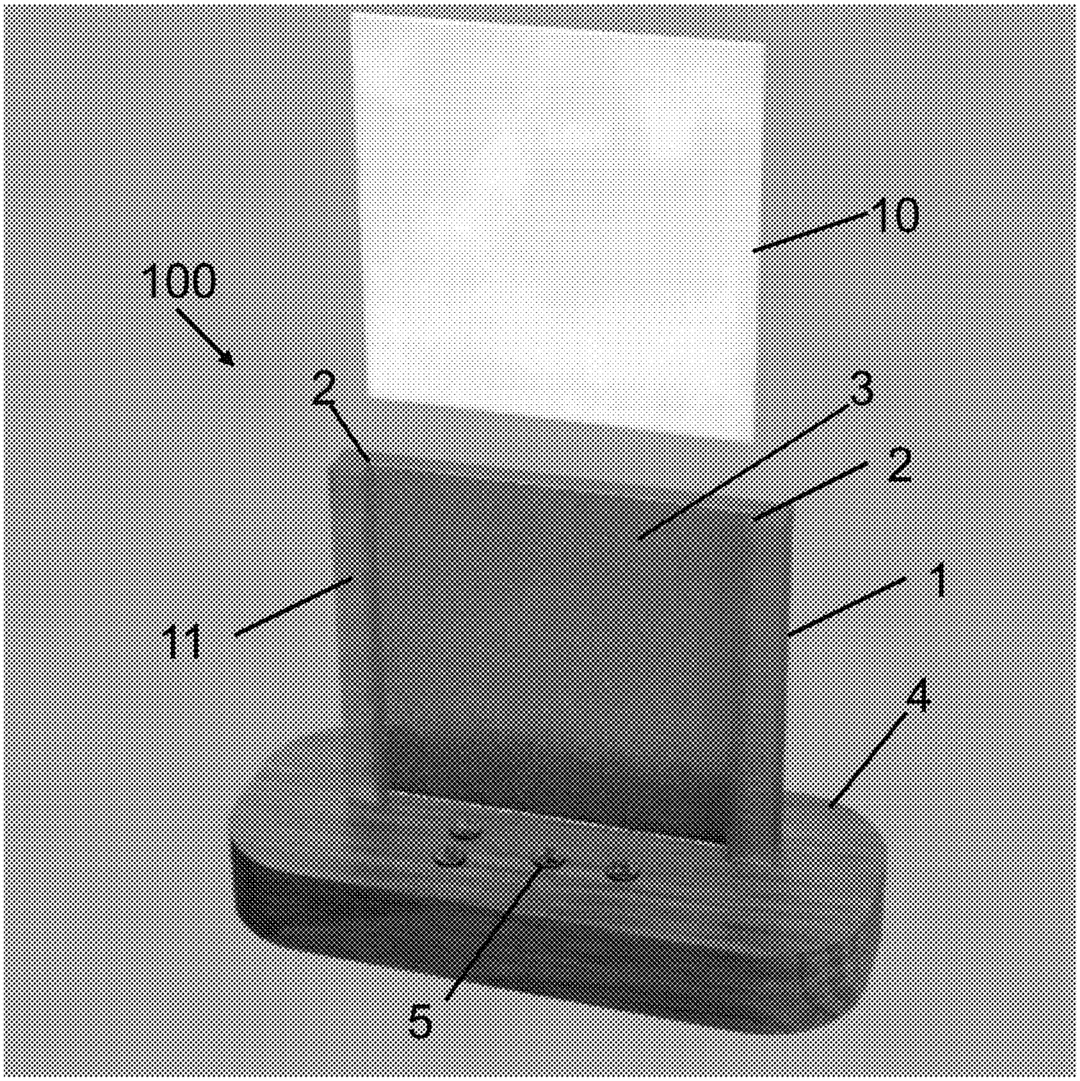
FIG. 4 is a perspective view of a display unit for lithophanes with a lithophane positioned for insertion into slots according to some embodiments of the present technology.

FIG. 4 is a perspective view of a display unit 100 for lithophanes 10 with a lithophane positioned for insertion into slots 2 according to some embodiments of the present technology. As shown in FIG. 4, and also in FIGS. 2 and 3, each slot 2 of the pair of opposing slots 2 extends from the top of a respective structure 11 of the pair of structures 11 to a bottom of the respective structure 11. In some embodiments, slots 2 may be shaped and dimensioned to enable lithophane 10 to be alternately inserted and removed from the multi-functional stand piece 1. As such, a user of the display unit 100 may conveniently view images present in a lithophane 10 without having to hold it or handle it at all. Furthermore, a user of display unit 100 is also able to conveniently switch out different lithophanes 10.

When inserted, one side of lithophane 10 may be positioned adjacent to the roughened surface 3 of stand piece 1. In an example, at least a portion of the lithophane 10 may be in contact with roughened surface 3 when inserted into slots 2 of stand piece 1. In another example, lithophane 10 may not contact roughened surface 3 when so inserted. In some embodiments, when lithophane 10 is inserted into the slots 2 of the stand piece 1, a bottom of lithophane 10 may rest on the top surface of base 4.

Figure 7:
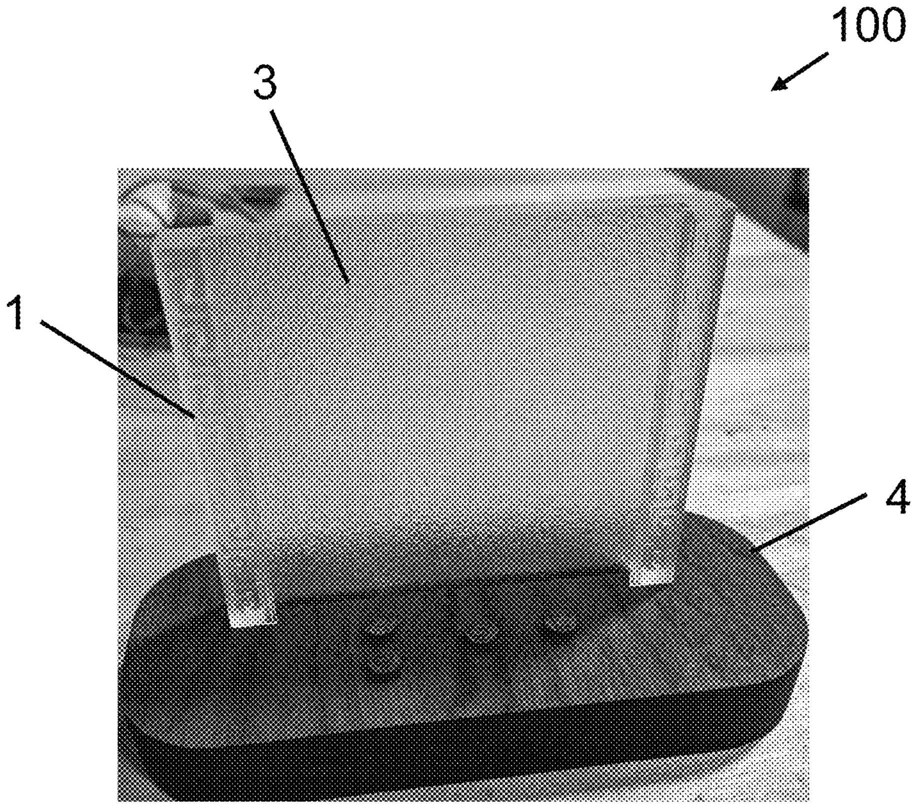
FIG. 7 is a perspective view of a display unit for lithophanes according to some embodiments of the present technology.
Figure 8:
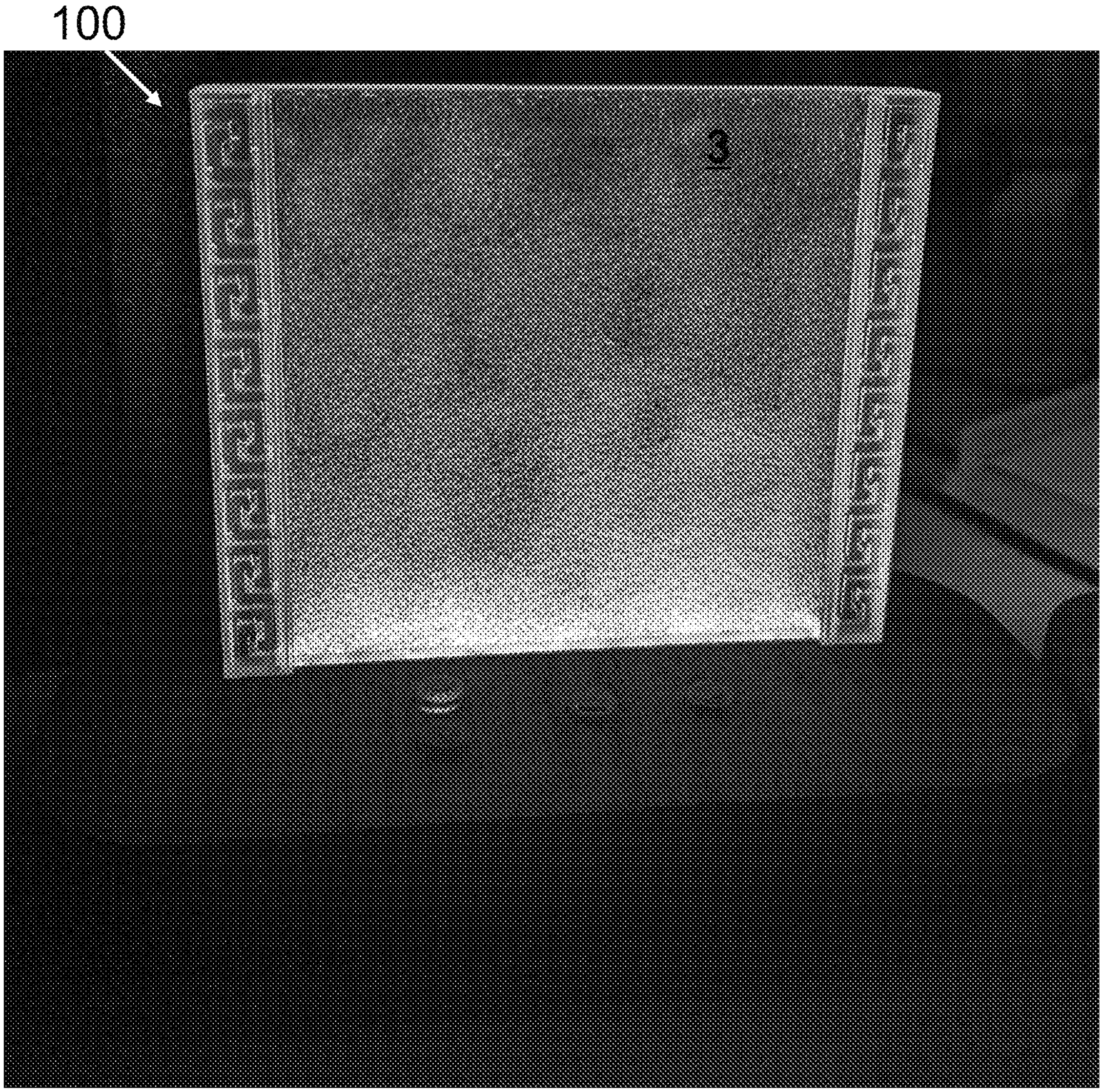
FIG. 8 depicts the display unit of FIG. 7 in a darkened room with a white light source turned on without an inserted lithophane.
Figure 9:
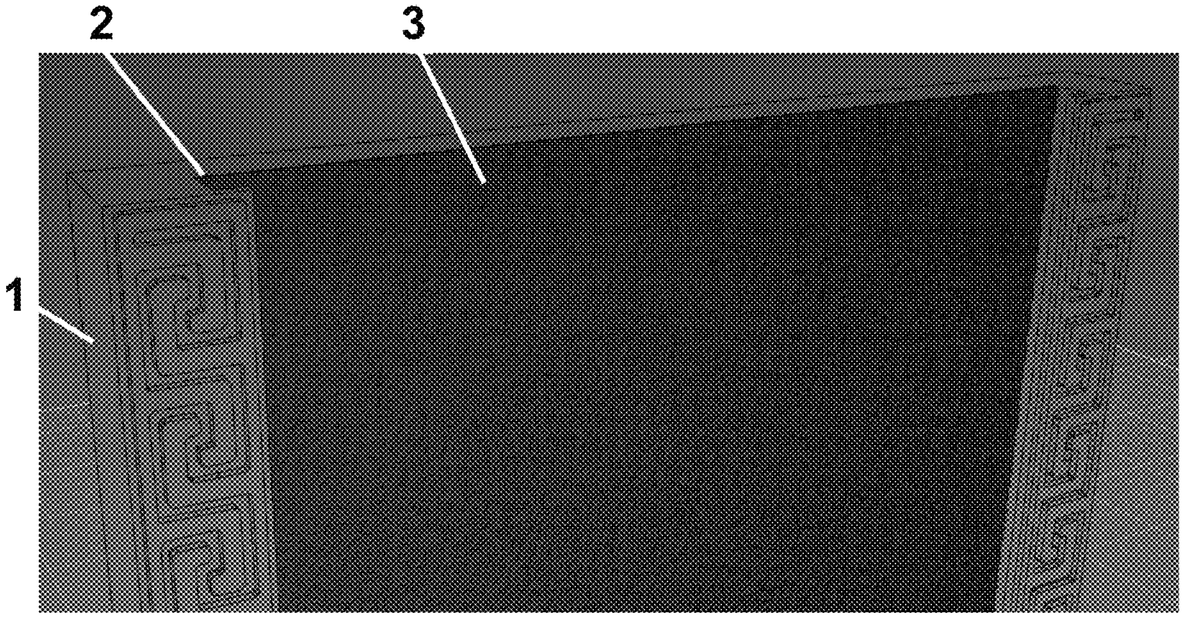
FIG. 9 is a perspective view of a portion of a multifunctional stand piece of a display unit according to some embodiments of the present technology.

FIG. 7 is a perspective view of a display unit 100 for lithophanes 10 according to some embodiments of the present technology. FIG. 8 depicts the display unit 100 of FIG. 7 in a darkened room with a white light source 6 turned on without an inserted lithophane 10. FIG. 9 is a perspective view of a portion of a multi-functional stand piece 1 of a display unit 100 according to some embodiments of the present technology. FIGS. 7-9 depict additional views of the roughened surface 3 according to some embodiments of the present technology. In some embodiments, the portion of stand piece 1 having roughened surface 3 may have a surface area (e.g., 100 mm×100 mm) to match a length and width of a lithophane 10 to be viewed using the display unit 100 according to the present technology.

Referring also to FIGS. 3 and 6, with the bottom of multi-functional stand piece 1 inserted into receptacle 8 and positioned proximate to, or contacting, light source 6 (e.g., LED strip), light emitted therefrom (denoted as light path 7 in FIGS. 3 and 6) is transmitted into the material of construction of the stand piece 1 during operation of display unit 100 according to the present technology. Upon entering the material of stand piece 1, the light path 7 taken may be in a generally top-ward direction, as shown in FIGS. 3 and 6. A portion of the light will reach roughened surface 3 and upon that occurring, the light path 7 for that portion of the light will change direction, including changing direction from the aforementioned top-ward direction to a direction that is generally frontward facing (e.g., perpendicular to the frontward facing surface of stand piece 1, as shown, for example, in FIGS. 2 and 3). Upon changing its direction of travel in this manner and on account of the roughened surface 3, light path 7 may exit the material of construction of stand piece 1 through the roughened surface 3, as shown in FIG. 3. That portion of the light may thereby pass through a lithophane 10 positioned in slots 2 of the display unit 100 according to the present technology. As shown in FIG. 8, the function of light path 7 in the multi-functional stand piece 1 according to the present technology creates an area of bright light that may be at least approximately the same size as a lithophane to be inserted in front of the roughened surface 3 area by way of the slots 2.

Figure 10:
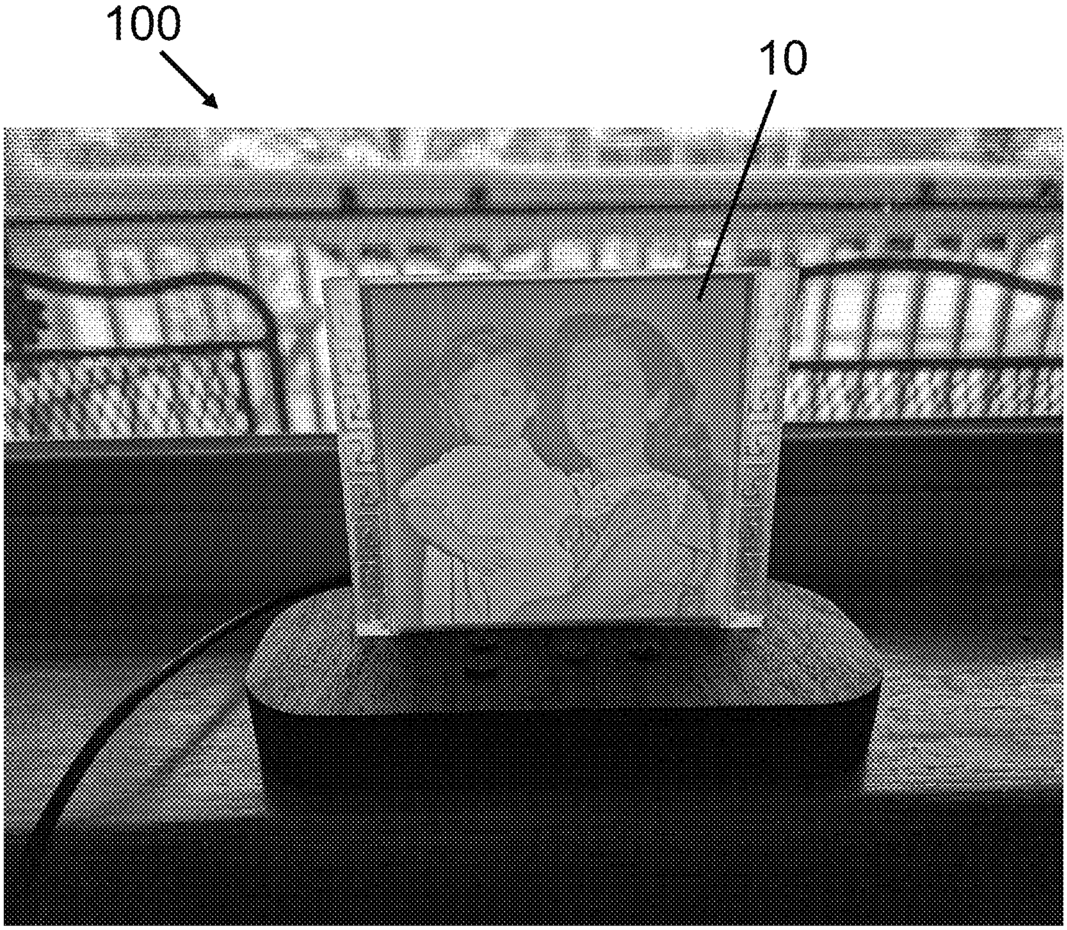
FIG. 10 depicts the lithophane shown in FIG. 1 being backlit by natural daylight while positioned in a display unit according to some embodiments of the present technology.
Figure 11:
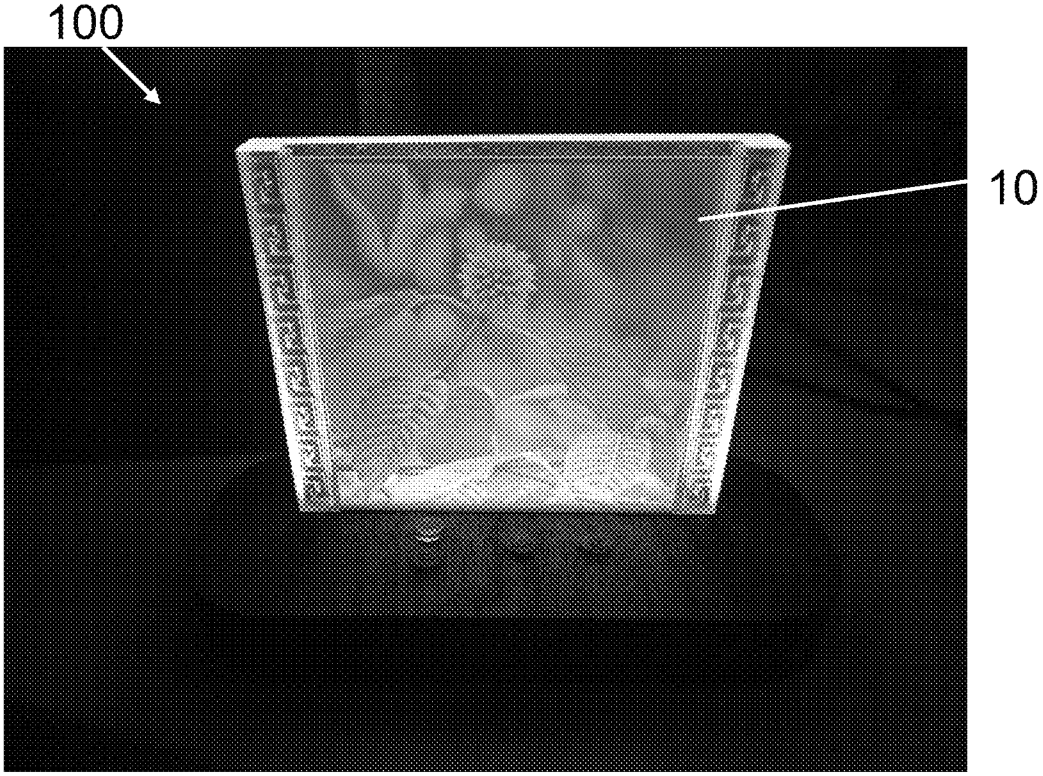
FIG. 11 depicts another lithophane being backlit in a darkened room using a white light source of a display unit according to some embodiments of the present technology.

FIG. 11 depicts another lithophane being backlit in a darkened room using a white light source of a display unit according to some embodiments of the present technology. With the light source 6 (e.g., white light LEDs arranged in a strip of LEDs, as described above above) energized and a lithophane 10 inserted into display unit via slots 2 in a darkened room, the above described change(s) in the direction of travel of light path 7 provided by the stand piece 1 with the roughened surface 3 thereby illuminates the lithophane 10 and enables the image present in the lithophane 10 to be viewed in the absence of daylight, or in a darkened room, as shown in FIG. 11. FIG. 10 depicts the lithophane shown in FIG. 1 being backlit by natural daylight while positioned in a display unit according to some embodiments of the present technology. Notably, the display unit 100 may be used to view an image present in a lithophane using natural daylight and without having to turn on the light source 6, as shown in FIG. 10.

Figure 13:
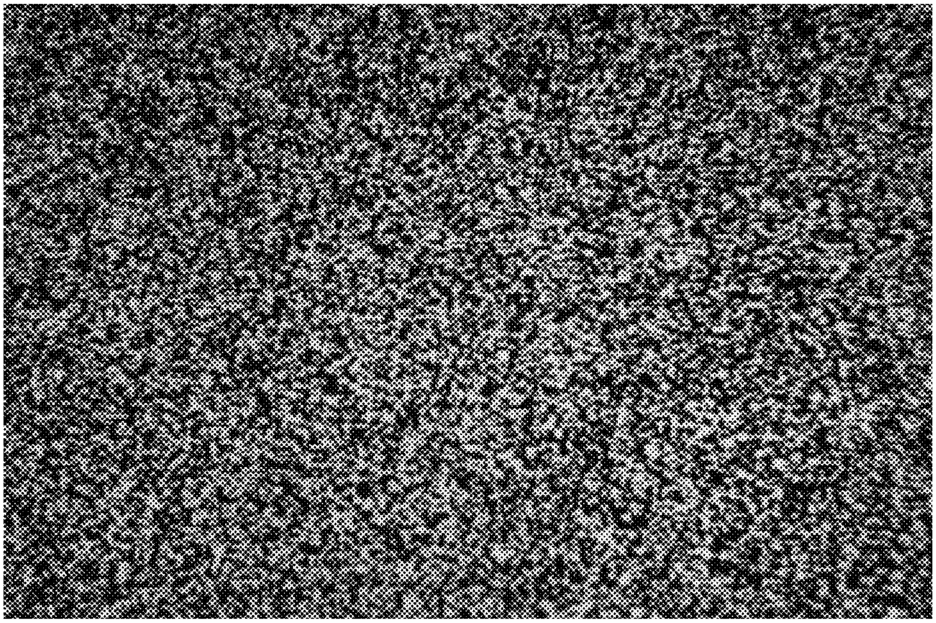
FIG. 13 depicts an image of white noise that may be used to create a roughened surface on the front side of the stand piece for use in a display unit according to some embodiments of the present technology.

In some embodiments, the roughened surface 3 may be created by first preparing to make a 3D lithophane from an image of white noise 20 (e.g., as would be seen for static or noise of a black and white television, as shown in FIG. 13). Then, in a suitable computer-aid design (CAD) software application, an electronic file (e.g., a .stl file) containing data representative of a 3D model prepared for 3D printing of the lithophane 20 may be combined (e.g., placed onto) the front facing surface of a 3D model of the stand piece 1. Next, the stand piece 1 having the roughened surface 3 may be 3D printed (e.g., by an SLA-based technique) to thereby produce the multifunctional stand piece 1 for use in the display unit 100 according to the present technology. The resulting randomized 3D bump map for the roughened surface 3 of the front facing surface of stand piece 1, during operation of display unit 100, facilitate diffusing light of the light path 7 originating at light source 6 evenly onto the inserted lithophane 10, as well as optimize light brightness for displaying the image present in lithophane 10 at night or in a dark room. Furthermore, as described below with reference to FIG. 14, a slight angled (of from greater than 0 degrees to less than or equal to 5 degrees, e.g., 1-2 degrees) surface of the front face of stand piece 1, including the roughened surface 3, further enhances the even diffusion of light along the roughened surface 3 and inserted lithophane 10.

Figure 12:
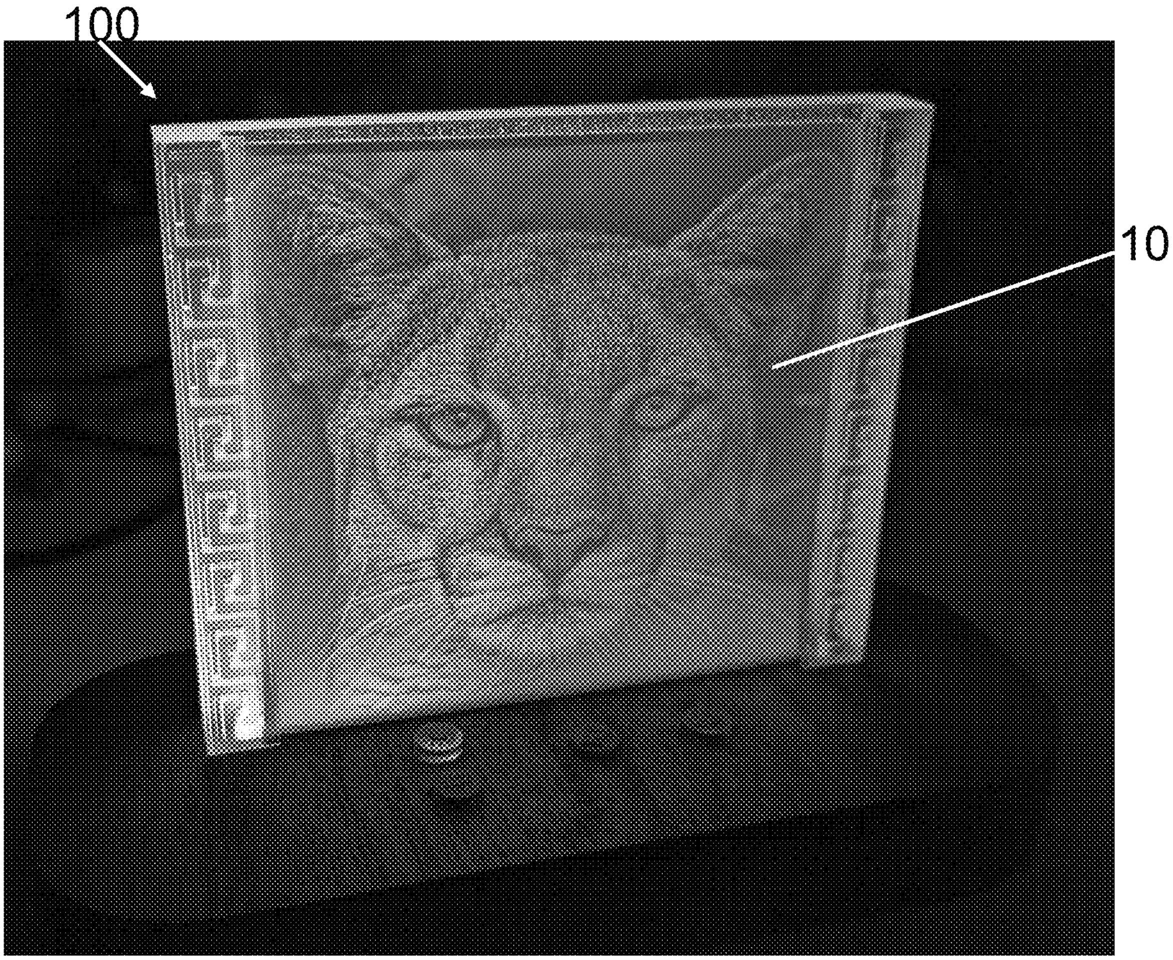
FIG. 12 depicts another lithophane being backlit in a darkened room with a variable color light source of a display unit according to some embodiments of the present technology.

Referring back to FIGS. 2-5, in addition to a button 5 (or other switch) for turning light source 6 on and off, button(s) 5 accessible to the user of display unit 100 may include means for adjusting the brightness of the light source 6 for in the techniques according to the present technology. FIG. 12 depicts another lithophane being backlit in a darkened room with a variable color light source of a display unit according to some embodiments of the present technology. In examples where light source 6 is embodied in a plurality of LED lamps arranged laterally, one or more of the LEDs may have a different color when energized as compared to at least one other LEDs. In some embodiments, one or more of the plurality of LED lamps of light source 6 may be capable of being illuminated at two or more different colors depending on an applied electric current to them. In some embodiments, logic circuitry or other analog and/or digital electronic components may be present inside of base 4 and operably coupled to light source 6 embodied in a strip of a plurality of multi-color LEDs. In an example, a button 5 may be operably coupled to the aforementioned logic circuitry. Such a button 5 (or likewise a switch or a knob) may be accessible to the user of display unit 100 in order to activate an LED coloration or color change scheme to achieve an effect as shown in FIG. 12. In an example, such a button 5 may also enable switching the light source 6 from being white light to being colored light (or combinations of different colors). Individual LED lamps of a light source 6 embodied in an LED strip according to some embodiments of the present technology may be individually addressable to logic circuitry to achieve effects (which may be timed or choreographed) like flickering candle light, multi-color wipes, among a multitude of other possibilities.

In some embodiments, turning light source on and off, and/or controlling brightness, color, and/or changing of lighting effects, may be accomplished wirelessly by way of, for example, a WiFi or Bluetooth communications protocol. In an example, a user of display unit 100 may have an app installed on a smartphone and display unit may include a suitable radio frequency (RF) receiver to receive signals from the smartphone to control any of the above-described operations involving light source 6.

Figure 14:
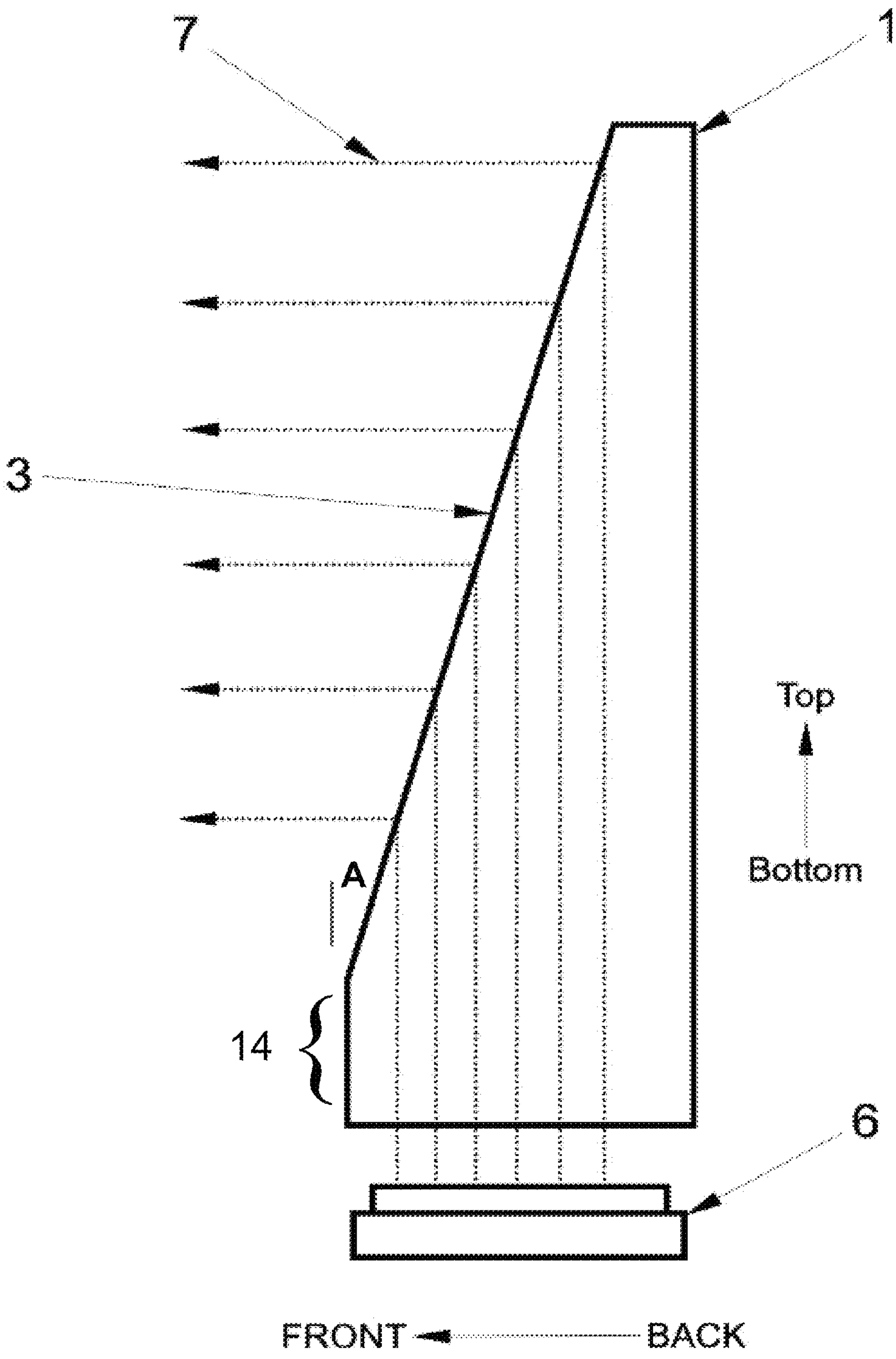
FIG. 14 is a side sectional view of the stand piece depicting an angled front surface for use in a display unit according to some embodiments of the present technology.

FIG. 14 is a side sectional view of the stand piece 1 depicting an angled front surface 3 for use in a display unit 100 according to some embodiments of the present technology. Features described above with reference to FIG. 2 are also shown in FIG. 14 for context. The sectional view of FIG. 14 is taken in the middle of the stand piece 1 of FIG. 2 from top to bottom. Note that the angle is largely exaggerated to illustrate the light rays being more evenly distributed as they exit the roughened surface 3 of stand piece 1. In some embodiments, the front of the stand piece 1, including roughened surface 3 may be angled slightly (e.g., 1-2 degrees, exaggerated and not shown to scale in FIG. 14) backwards (from front to back), giving the roughened surface 3 a subtle slope from the bottom to the top of at least a portion of the stand piece 1 and towards the back of the display unit 100. This angle is denoted "A" in FIG. 14. In some embodiments, angle "A" may range from greater than 0 degrees to less than or equal to 5 degrees. The aforementioned slight angle may allow the upward shining light path 7 provided by light source 6 to more evenly distribute along the roughened surface 3 where the light 7 then exits the front surface of the stand piece 1, where it may then shine through a positioned lithophane 10. As such, the slightly angled surface feature according to the present technology may provide a more uniform diffusion of brightness behind the lithophane 10, ensuring a more evenly lit from top to bottom 3D image.

Figure 15:
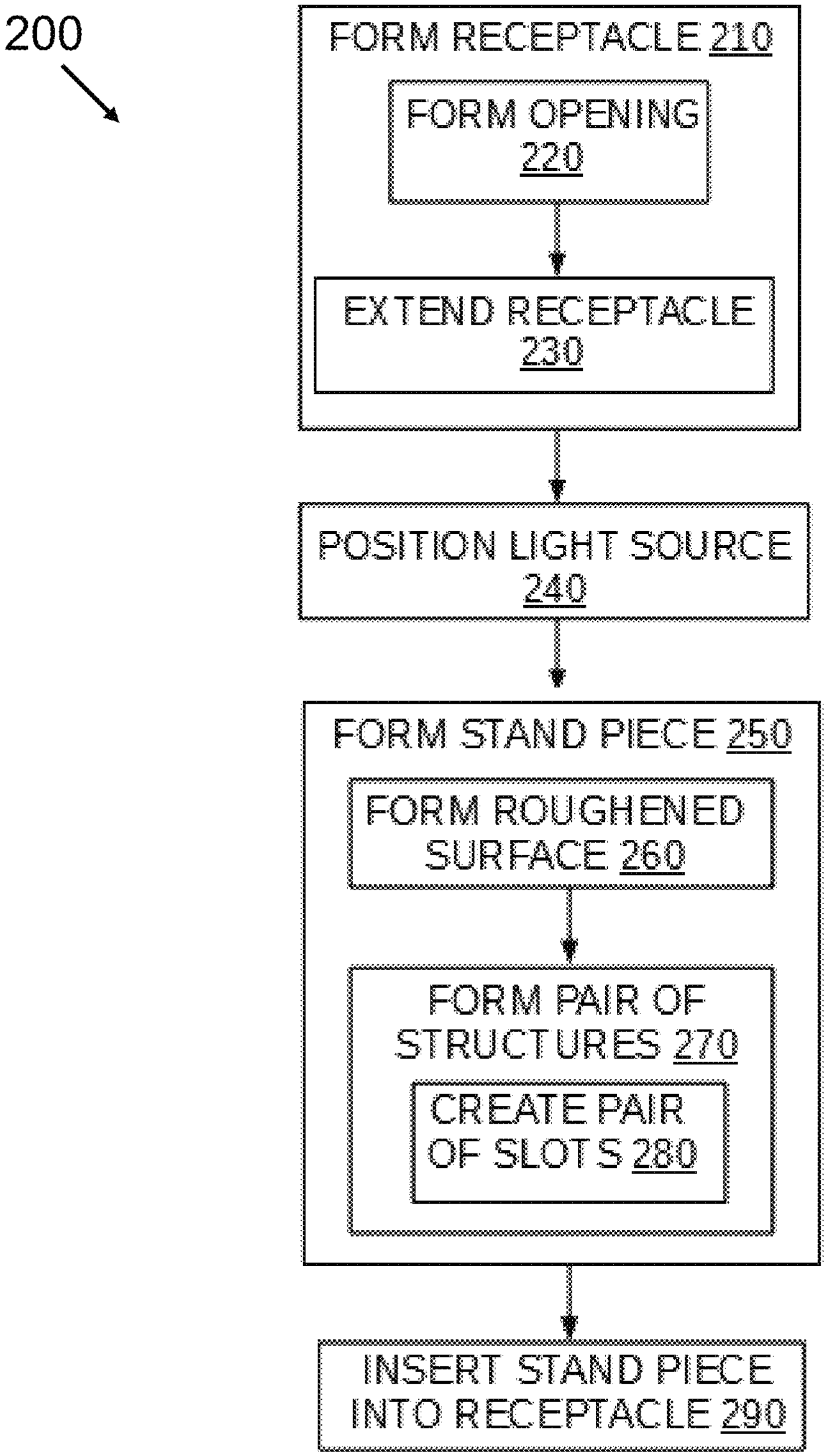
FIG. 15 is a flow chart of a method of manufacturing a display unit for lithophanes according to some embodiments of the present technology.

FIG. 15 is a flow chart of a method 200 of manufacturing a display unit 100 for lithophanes 10 according to some embodiments of the present technology. Further reference is made to features described in FIGS. 2-6 and the foregoing figures. The method 200 may include the step of forming 210 a receptacle 8 in a portion of a base 4 of the display unit 100. In some embodiments, forming 210 the receptacle 8 may include the steps of: forming 220 an opening 9 in a portion of a top surface of the base 4; and extending 230 the receptacle 8 downward from the opening 9 into a portion of the base 4. Method 200 may include the step of positioning 240 a light source 6 at or proximal to a bottom of the receptacle 8. Method 200 may include the step of forming 250 a stand piece 1 having a top and a bottom, and with the bottom of the stand piece 1 being configured to be inserted into the receptacle 8.

In some embodiments, the method 200 step of forming 250 the stand piece 1 may include the steps of: forming 260 a roughened surface 3 on at least a portion of a front side of the stand piece 1; and forming 270 a pair of structures 11 disposed on opposing sides of the stand piece 1 and extending from a top of the stand piece 1 to or proximate to the bottom of the stand piece 1. In an example, forming 270 the pair of structures 11 may include creating 280 a pair of slots 2 extending from tops of the structures 11 to bottoms of the structures 11, the slots 2 being configured to receive opposing sides of a lithophane 10. In some embodiments, the method 200 step of forming 250 the stand piece 1 may include forming the stand piece 1 to include an angled section including the roughened surface 3. With reference to FIG. 14, stand piece 1 may be formed to have a backward angle (denoted "A" in FIG. 14), where A may be greater than 0 degrees and less than or equal to 5 degrees. In an example, angle A is from 1 degree to 2 degrees. In another example, angle A is greater than 1 degree and less than 2 degrees. In embodiments where the method 200 step of forming 250 the stand piece 1 includes forming the stand piece 1 to include the above described angled section, the method 200 may also include forming the stand piece to have a non-angled (e.g., straight or 0 degrees—that is, normal to a top surface of base 4, as shown in FIG. 3) portion (e.g., labeled 14 in FIGS. 2 and 14) to provide the above described offset or space 14. In an example, the aforementioned non-angled portion may be positioned at a bottom of stand piece 1 and may have a height that is approximately equal to a depth from the top of receptacle 8 (e.g., at opening 9) corresponding to a top of base 4 and the top of light source 6 positioned at a bottom of receptacle 8. As shown in FIG. 14, the non-angled portion may be formed in method 200 beneath the angled portion of stand piece 1 and it may have a height that is largely less than a height of the angled portion.

In one example, the receptacle 8 may be formed 210 in method 200 before the stand piece 1 is formed 250. In another example, the stand piece 1 may be formed 250 before the receptacle 8 is formed 210 in method 200. In yet another example, the receptacle 8 may be formed concurrently with the stand piece 1 being formed 250 in method 200. In some embodiments, method 200 may also include the step of inserting 290 the bottom of the stand piece 1 into the receptacle 8 to bring the bottom of the stand piece 1 in contact with or in proximity to the light source 6.

The above described display unit 100 for lithophanes, including the various embodiments thereof described by way of example with reference to the attached figures, address the above mentioned problems in the conventional devices and techniques for displaying lithophanes. By practicing the present technology, users of display unit 100 no longer need to choose between illuminating lithophanes with either natural (e.g., daylight) or artificial (e.g., electric) light; rather, the user may utilize the single display unit 100 as disclosed here without having to move a lithophane from place to place. The user of display unit 100 for lithophanes may thereby experience a heightened level of convenience and enjoyment in viewing lithophanes, and lithophanes are not subject to excessive manual handling and are thereby more likely to remain intact for longer periods as compared to lithophanes viewed using the conventional, known techniques. Additional other advantageous practical advantages and beneficial technical effects are expected to be readily envisaged and appreciated in the fields of lithophane views, as well as other fields where the present technology may find utility, by persons having ordinary skill in the art.

Unless the context clearly requires otherwise, throughout the description and the claims, the words “include,” “including,” “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof, means any connection or coupling, either direct or indirect, between two or more elements; the coupling of connection between the elements can be physical, logical, or a combination thereof. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. The word “or,” in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium (Any claims intended to be treated under 35 U.S.C. § 112(f) will begin with the words “means for”). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A display unit for lithophanes, the display unit comprising:
- a base including an opening formed in a portion of a top surface of the base;
- a receptacle extending downward from the opening and into a portion of the base;
- a light source positioned at or proximal to a bottom of the receptacle; and
- a stand piece having a top and a bottom, wherein the bottom of the stand piece is configured to be inserted into the receptacle to bring the bottom of the stand piece in contact with or in proximity to the light source, and wherein the stand piece includes:
  - a roughened surface formed on at least a portion of a front side of the stand piece; and
  - a pair of structures disposed on opposing sides of the stand piece and extending from a top of the stand piece to or proximate to the bottom of the stand piece, wherein the pair of structures include a pair of slots extending from tops of the structures to bottoms of the structures, the slots configured to receive opposing sides of a lithophane.

2. The display unit of claim 1, wherein the base includes an interior cavity, the display unit further comprising a power supply disposed at least in part inside the interior cavity and operably coupled to the light source.

3. The display unit of claim 2 further comprising means accessible to a user during use of the display unit and operably coupled to at least one of the power supply and the light source for alternately turning the light source on and off.

4. The display unit of claim 1, wherein the light source includes a strip of a plurality of light emitting diodes (LEDs).

5. The display unit of claim 1, wherein the at least the portion of a front side of the stand piece on which the roughened surface is formed is clear or translucent.

6. The display unit of claim 1, wherein a material of construction of the stand piece is a clear or translucent material.

7. The display unit of claim 1, wherein the least a portion of the front side of the stand piece including the roughened surface is angled backward from front to back and from the bottom to the top.

8. The display unit of claim 7, wherein the at least a portion of the front side of the stand piece is angled at an angle of from greater than 0 degrees to less than or equal to 5 degrees.

9. The display unit of claim 8, wherein the at least a portion of the front side of the stand piece is angled at an angle of from 1 degree to 2 degrees.

10. A display unit for lithophanes, the display unit comprising:
- a base including an opening formed in a portion of a top surface of the base;
- a receptacle extending downward from the opening and into a portion of the base;
- a light source positioned at or proximal to a bottom of the receptacle; and
- a stand piece having a top and a bottom, wherein the bottom of the stand piece is configured to be inserted into the receptacle to bring the bottom of the stand piece in contact with or in proximity to the light source, wherein the stand piece includes:
  - a roughened surface formed on at least a portion of a front side of the stand piece; and
  - a pair of structures disposed on opposing sides of the stand piece and extending from a top of the stand piece to or proximate to the bottom of the stand piece, wherein the pair of structures include a pair of slots extending from tops of the structures to bottoms of the structures, the slots configured to receive opposing sides of a lithophane, and
- wherein the least a portion of the front side of the stand piece including the roughened surface is angled backward from front to back and from the bottom to the top.

11. The display unit of claim 10, wherein the at least a portion of the front side of the stand piece is angled at an angle of from greater than 0 degrees to less than or equal to 5 degrees.

12. A method of manufacturing a display unit for lithophanes, the method comprising:
- forming a receptacle in a portion of a base of the display unit, wherein forming the receptacle comprises:
  - forming an opening in a portion of a top surface of the base; and
  - extending the receptacle downward from the opening into a portion of the base;
- positioning a light source at or proximal to a bottom of the receptacle; and
- forming a stand piece having a top and a bottom, and with the bottom of the stand piece being configured to be inserted into the receptacle, wherein forming the stand piece includes:
  - forming a roughened surface on at least a portion of a front side of the stand piece; and
  - forming a pair of structures disposed on opposing sides of the stand piece and extending from a top of the stand piece to or proximate to the bottom of the stand piece, wherein forming the pair of structures comprises creating a pair of slots extending from tops of the structures to bottoms of the structures, and with the slots being configured to receive opposing sides of a lithophane.

13. The method of claim 12 further comprising inserting the bottom of the stand piece into the receptacle to bring the bottom of the stand piece in contact with or in proximity to the light source.

14. The method of claim 12, wherein the base includes an interior cavity, the method further comprising positioning a power supply at least in part inside the interior cavity.

15. The method of claim 14 further comprising operably coupling the light source to the power supply.

16. The method of claim 12 further comprising positioning means accessible to a user during use of the display unit for alternately turning the light source on and off in or on the base.

17. The method of claim 16 further comprising operably coupling the means to the light source.

18. The method of claim 12, wherein forming the roughened surface comprises forming the roughened surface on the at least a portion of the front side of the stand piece that is clear or translucent.

19. The method of claim 12, wherein forming the stand piece comprises forming the stand piece of a clear or translucent material of construction.

20. The method of claim 12, wherein forming the stand piece comprises forming the least a portion of the front side of the stand piece including the roughened surface to be angled backward from front to back and from the bottom to the top.

* * * * *